(12) United States Patent
Pearson

(10) Patent No.: US 8,057,667 B2  
(45) Date of Patent: Nov. 15, 2011

(54) MULTIPHASE SEPARATION VACUUM SYSTEM

(76) Inventor: Dale Pearson, Alpine, CA (US)

( * ) Notice: Subject to any disclaimer, the term of this patent is extended or adjusted under 35 U.S.C. 154(b) by 862 days.

(21) Appl. No.: 12/115,923

(22) Filed: May 6, 2008

(65) Prior Publication Data

US 2009/0277851 A1    Nov. 12, 2009

(51) Int. Cl.  
*B01D 19/00* (2006.01)

(52) U.S. Cl. ........ 210/188; 210/241; 210/513; 210/519; 210/532.1; 210/539

(58) Field of Classification Search .................. 210/188, 210/241, 513, 519, 532.1  
See application file for complete search history.

(56) References Cited

U.S. PATENT DOCUMENTS

| | | | | |
|---|---|---|---|---|
| 4,919,826 A * | 4/1990 | Alzner | ......................... | 210/788 |
| 6,960,294 B2 * | 11/2005 | Arnaud | ...................... | 210/195.1 |
| 7,410,570 B2 * | 8/2008 | You et al. | ...................... | 210/188 |
| 7,507,280 B2 * | 3/2009 | Tomshak et al. | ................ | 96/204 |
| 2003/0168391 A1 * | 9/2003 | Tveiten | ......................... | 210/188 |
| 2004/0129633 A1 * | 7/2004 | Edmondson | .................. | 210/521 |
| 2008/0173590 A1 * | 7/2008 | Duesel et al. | ................ | 210/767 |
| 2009/0223890 A1 * | 9/2009 | Frankin et al. | ............... | 210/601 |

* cited by examiner

*Primary Examiner* — Chester Barry  
(74) *Attorney, Agent, or Firm* — Gordon & Rees LLP

(57) ABSTRACT

A vacuum system for wastewater removal and filtration, comprising: (1) at least one velocity reducing gravity separator, comprising: (a) a water input line; (b) a water velocity reduction mechanism at an end of the water input line; (c) a settling tank; and (d) a water output line; and (2) at least one negative pressure filter pump, comprising: (a) a water input line; (b) a water velocity reduction mechanism at an end of the water input line; (c) a filtration tank; (d) a filter cloth in the filtration tank; (e) a sump pump disposed on an opposite side of the filter cloth from the water input line; (f) a water output line connected to the sump pump; and (g) an air vacuum exit line.

14 Claims, 5 Drawing Sheets

MULTIPHASE SEPARATION VACUUM SYSTEM

TECHNICAL FIELD

The present invention relates to vacuum systems for wastewater filtration.

SUMMARY OF THE INVENTION

The present invention provides a multiphase separation vacuum that uses three different types of technologies to remove particulate contaminants found in the wastewater of high-pressure water cleaning and removal systems. The wastewater is vacuumed and then filtered to meet local, state and federal standards prior to its disposal into a sanitary sewer system.

The present invention provides a vacuum system for wastewater removal and filtration, comprising: (1) at least one velocity reducing gravity separator, comprising: (a) a water input line; (b) a water velocity reduction mechanism at an end of the water input line; (c) a settling tank; and (d) a water output line; and (2) at least one negative pressure filter pump, comprising: (a) a water input line; (b) a water velocity reduction mechanism at an end of the water input line; (c) a filtration tank; (d) a filter cloth in the filtration tank; (e) a sump pump disposed on an opposite side of the filter cloth from the water input line; (f) a water output line connected to the sump pump; and (g) an air vacuum exit line.

In various optional embodiments, at least one cartridge filter is connected to the water output line of the negative pressure filter pump, and a vacuum is connected to the air vacuum exit line.

In various optional embodiments, the water velocity reduction mechanism changes the direction of the flow of water in the water input line and an inlet to the water output line is positioned below the water velocity reduction mechanism at the end of the water input line. As such, the inlet to the water output line is positioned such that water can not pass in a straight line from the water velocity reduction mechanism into the inlet to the water output line. This has the effect of keeping water in the settling tank longer, and slowing its rate of flow (enabling more contaminants to settle out into the tank).

In various optional embodiments, the filter cloth is positioned at an angle in the filtration tank, and/or the filter cloth is positioned in a conical arrangement in the filtration tank. This has the advantage of preventing the filter cloth from clogging with particulate.

The present invention also provides a method of filtering wastewater, comprising: passing the wastewater through a velocity reducing gravity separator having a settling tank, and a water velocity reduction mechanism to remove sediments from the wastewater; and then passing the wastewater through a negative pressure filter pump having a filtration tank with a filter cloth therein; while simultaneously vacuuming air out of the negative pressure filter pump and pumping the wastewater out of the negative pressure filter pump, wherein the wastewater is forced under pressure through the filter cloth. In preferred embodiments, the wastewater existing the negative pressure filter pump comprises passing the wastewater through at least one cartridge filter.

The present invention is ideally suited for removing contaminants such as asbestos from wastewater, for example as happens when water is used for hydroblasting building structures. In preferred applications, the wastewater may be filtered at levels up to 1 micron. The present invention is very versatile as it processes and stores waste automatically, while discharging filtered water to a sewer opening. In one optional embodiment, the present invention is installed on a truck or trailer such that it can conveniently be transported to a work site.

DETAILED DESCRIPTION OF THE DRAWINGS

Figure 1:
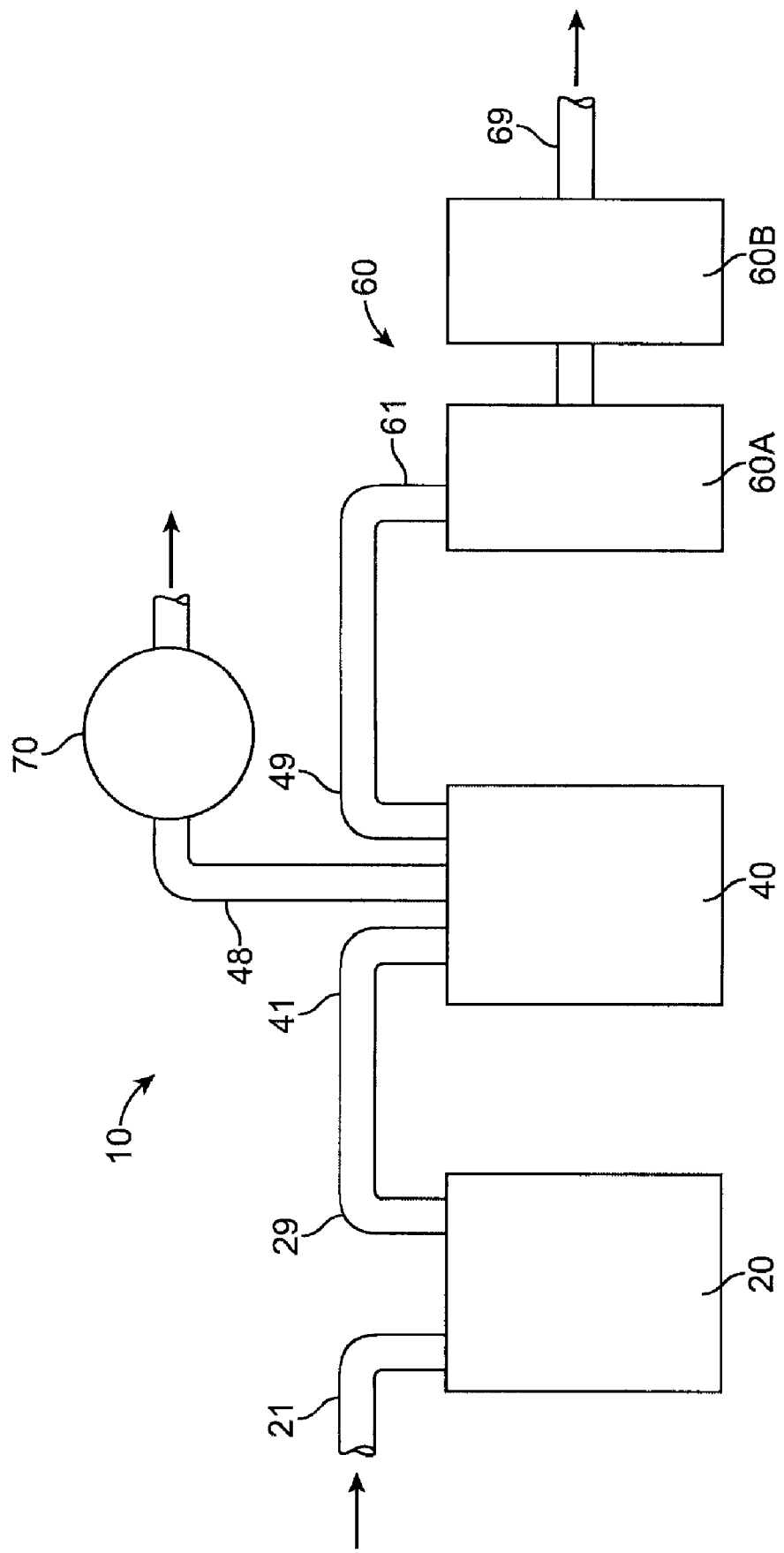
FIG. 1 is a schematic overview of the present system.

FIG. 1 is a schematic overview of the present multi-phase particulate separation vacuum system 10. The present invention comprises a velocity reducing gravity separator 20 and a negative pressure filter pump 40. Optionally, the present invention may also comprise one or more cartridge filters 60 and a vacuum system 70. Taken in sequence, velocity reducing gravity separator 20, negative pressure filter pump 40 and cartridge filter 60 represents three phases of water filtration/purification. At the same time, velocity reducing gravity separator 20, negative pressure filter pump 40 and vacuum system 70 represent three phases of air filtration/purification.

During operation, vacuum 70 pulls an air/water mixture into water input line 21, and then through velocity reducing gravity separator 20. Next, an air/water mixture (that has sediments removed) passes through water line 29/41 into negative pressure filter pump 40. Air is then vacuumed out through line 48 into vacuum 70, while filtered wastewater is simultaneously pumped out through line 49 (and then passes through one or more cartridge filters 60). Filtered wastewater is then ejected through a final exit line 69.

Figure 2:
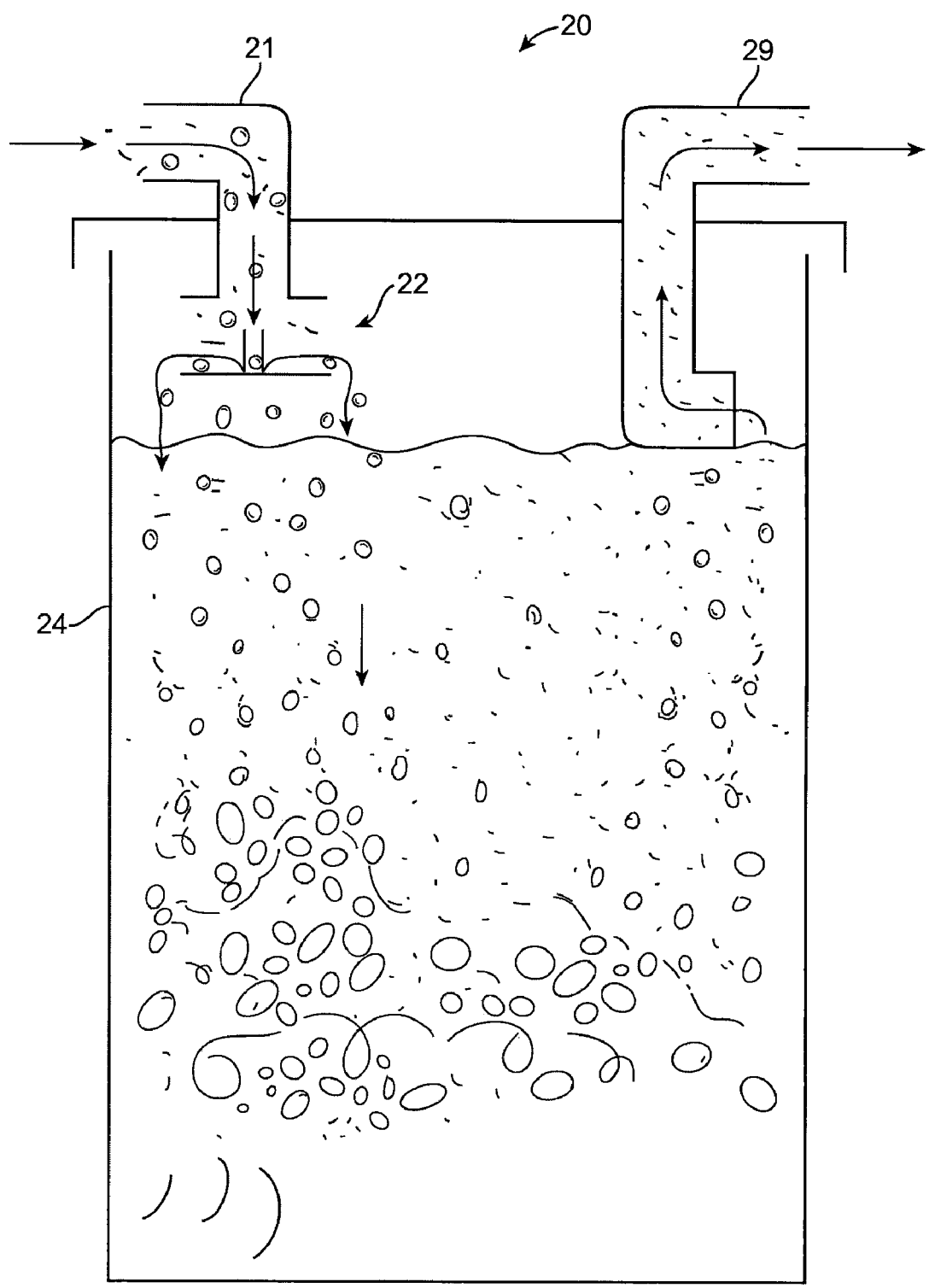
FIG. 2 is a cross sectional elevation view of the velocity reducing gravity separator.

In accordance with the present invention, a three stage filtering system is provided. As seen in FIG. 2, in the first stage, both water and air are filtered as an air/water mixture passes through velocity reducing gravity separator 20, as follows. First, the air/water mixture is enters through a water input line 21. Next, the air/water mixture passes out of a water velocity reduction mechanism 22 at an end of water input line 21.

In one preferred embodiment, water velocity reduction mechanism 22 changes the direction of the flow of water in the water input line, for example by 90 degrees (as illustrated). As a result of the mixture's reduced velocity, contaminant particulates settle out of the air/water mixture, dropping into settling tank 24. Separated water is then vacuumed out through water output line 29.

In preferred embodiments, the inlet to water output line 29 is positioned below the water velocity reduction mechanism 22 at the end of the water input line 21 (as illustrated). Alternatively, the inlet to the water output line 29 is positioned such that water can not pass in a straight line from the water velocity reduction mechanism 22 into the inlet to the water output line. For example, as illustrated, the inlet to line 29 is facing away from the outlet of velocity reduction mechanism 22. The advantage of both of these features is that it is difficult for water to pass from line 21 to line 29 without slowing down and spending time in settling tank 24. As such, the water removed through line 29 has a large percentage of its contaminants removed (by settling out) prior to the water exiting the first stage through line 29. Specifically, only the top layer of water in settling tank 24 is removed through water output line 29. Settling tank 24 may be a standard 55 gal DOT HAZMAT drum; however, the present invention is not so limited, and other tanks are encompassed by the present invention. In alternate embodiments, a pair of velocity reducing gravity separators 20 may be connected in series such that the water passing therethrough is purified in sequential steps (i.e.: with higher levels of purity in each of the sequential settling tanks).

Next, in the second stage, as illustrated in FIG. 2, the air/water mixture passes through water input line 41 into negative pressure filter pump 40. Note: the exit line 29 (FIG. 1) and input line 41 (FIG. 2) are connected or are one in the same continuous line. As seen in FIG. 2, negative pressure filter pump 40 comprises water input line 41; a water velocity reduction mechanism 42 at an end of water input line 41; a filtration tank 44; a filter cloth 45 in filtration tank 44; a sump pump 46 disposed on an opposite side of filter cloth 45 from water input line 41; a water output line 49 connected to sump pump 46; and an air vacuum exit line 48.

As can be seen, filter cloth 45 may be positioned at an angle in the filtration tank. As illustrated, the angle is about 45 degrees. Moreover, filter cloth 45 may optionally be positioned in a conical arrangement within filtration tank 44. In one exemplary embodiment, filter cloth 45 is a 125 micron filter cloth. Filter cloth 45 is preferably mounted on a frame within negative pressure filter pump 40. It is to be understood, however, that the present invention is not so limited and that other filter cloths and filtering systems are also encompassed within the scope of the present invention.

In operation, the air/water mixture passes out of water velocity reduction mechanism 42 and is projected against filter cloth 45. As illustrated, sediment that is too coarse to pass through filter cloth 45 will simply settle at the bottom of filtration tank 44 (while not blocking or building up against the upper portions of filter cloth 45). Water that passes through filter cloth 45 is then pumped out of water output line 49 by sump pump 46. Preferably, sump pump 46 is equipped with a back flow prevention valve.

This design is particularly advantageous in that it permits separation of the sediments (by use of filter cloth 45) without the captured sediments blocking the useable portion of filter cloth 45. As such, this system is advantageous over filtering systems which clog up as the sediment builds up against a filter cloth.

In one exemplary embodiment, the body of negative pressure filter pump 40 is made out of PVC poly, is 6 feet wide, 40 inches tall and has a capacity of 775 gals. It is to be understood however, that these materials and dimensions are merely exemplary and that the present invention is not so limited.

In one embodiment, sump pump 46 is equipped with two 6V deep cycle batteries hooked in parallel making the connection 12V. This 12V power is fed into a standard 12V to 110V inverter. When the pump switch is activated, it pulls power from the battery system. A generator unit also charges the battery for vacuum 70, and in turn charges the battery system. Again, these particular features of the invention are not limiting, and the present invention encompasses alternative electrical systems.

The third stage of the present system is different for air and water. Specifically, for air, the third stage is that the air is vacuumed out of vacuum exit line 48 and into vacuum 70 (see FIG. 1). In preferred embodiments, vacuum 70 is a HEPA vacuum. Preferably, vacuum 70 qualifies for asbestos and lead removal, surpassing all NESHAP and AHERA standards. Optionally, vacuum 70 may have an emergency overflow tank to ensure system integrity and provide redundant failsafe measures. A 125 Gal tank may be suitable, but the present invention is not so limited.

Figure 3:
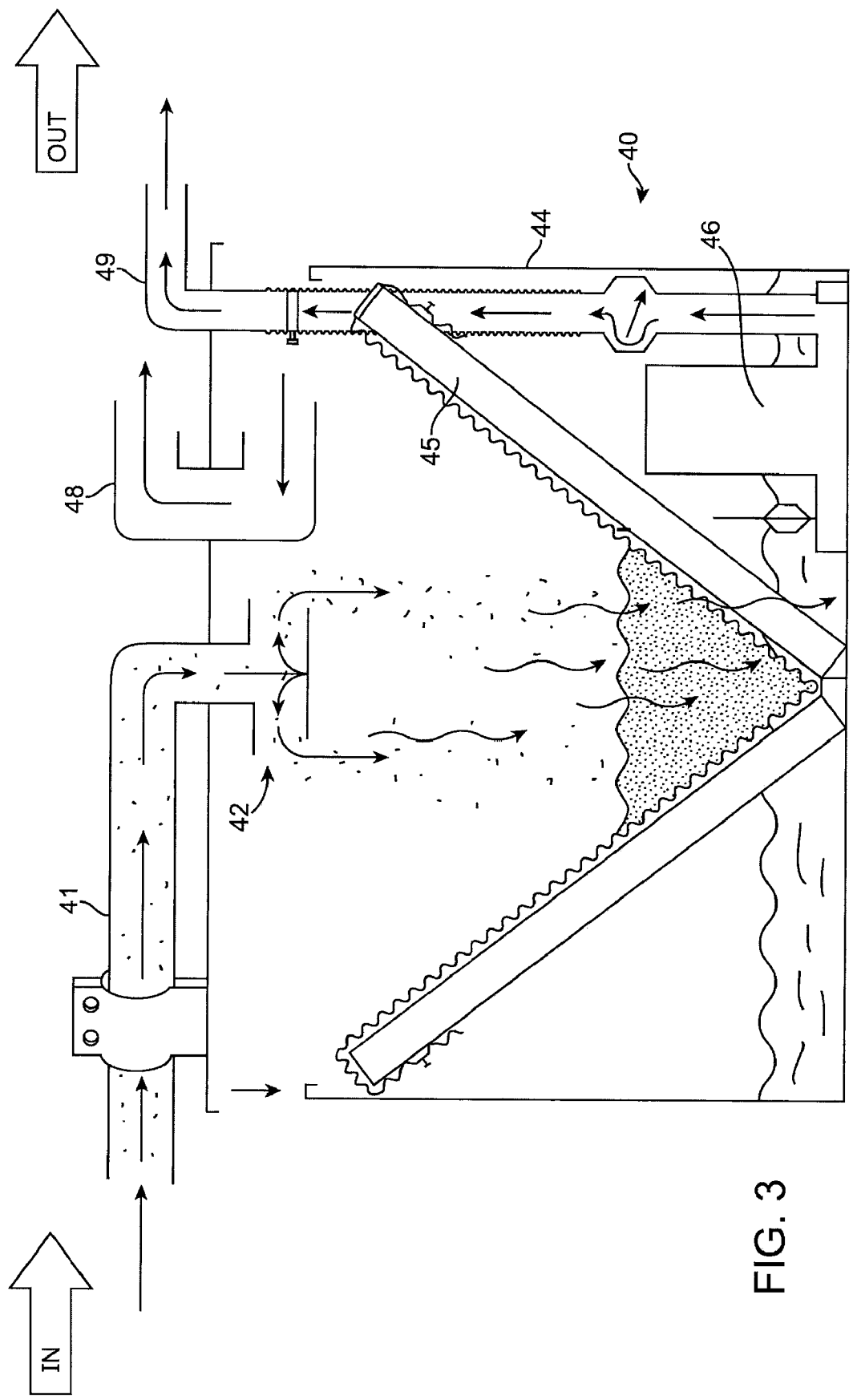
FIG. 3 is a cross sectional elevation view of the negative pressure filtration pump.
Figure 4:
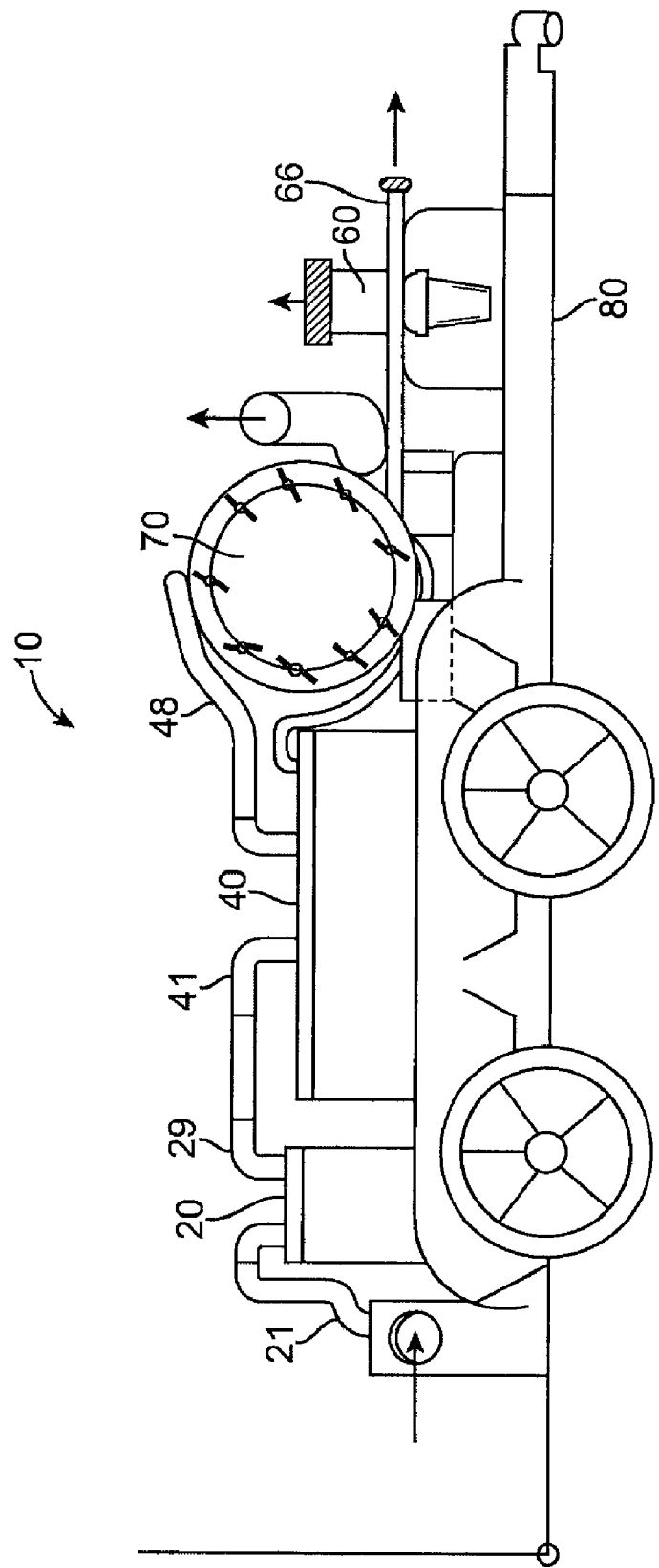
FIG. 4 is a cross sectional elevation view of a series of cartridge filters.

For water, the third stage is illustrated in FIG. 4, as follows. The water exiting line 49 (FIG. 3) then enters water input line 61. Note: exit line 49 (FIG. 3) and input line 61 (FIG. 4) are connected or are one in the same continuous line. Water then passes through one or more filters 60 (which may optionally be cartridge filters). In one exemplary embodiment, a plurality of filters 60 comprises a manifold of two different types of cartridge filters operating in series. It is to be understood that alternative filter designs are also encompassed within the scope of the present invention.

As seen in FIG. 4, filters 60 may comprise plurality of cartridge filters 60A connected in series to a plurality of cartridge filters 60B. Filters 60A may optionally be a twin bank of 36" 50 micron filter cartridges. Filters 60B may optionally be General Electric™ Smart Water™ water cartridges. Water enters filter system 60 through line 61, passing through manifold 62, filters 60A, manifolds 63 and 64, filters 60B, manifold 65 and then exits through line 66. In preferred embodiments, the wastewater is filtered at levels up to 1 micron.

Figure 5:
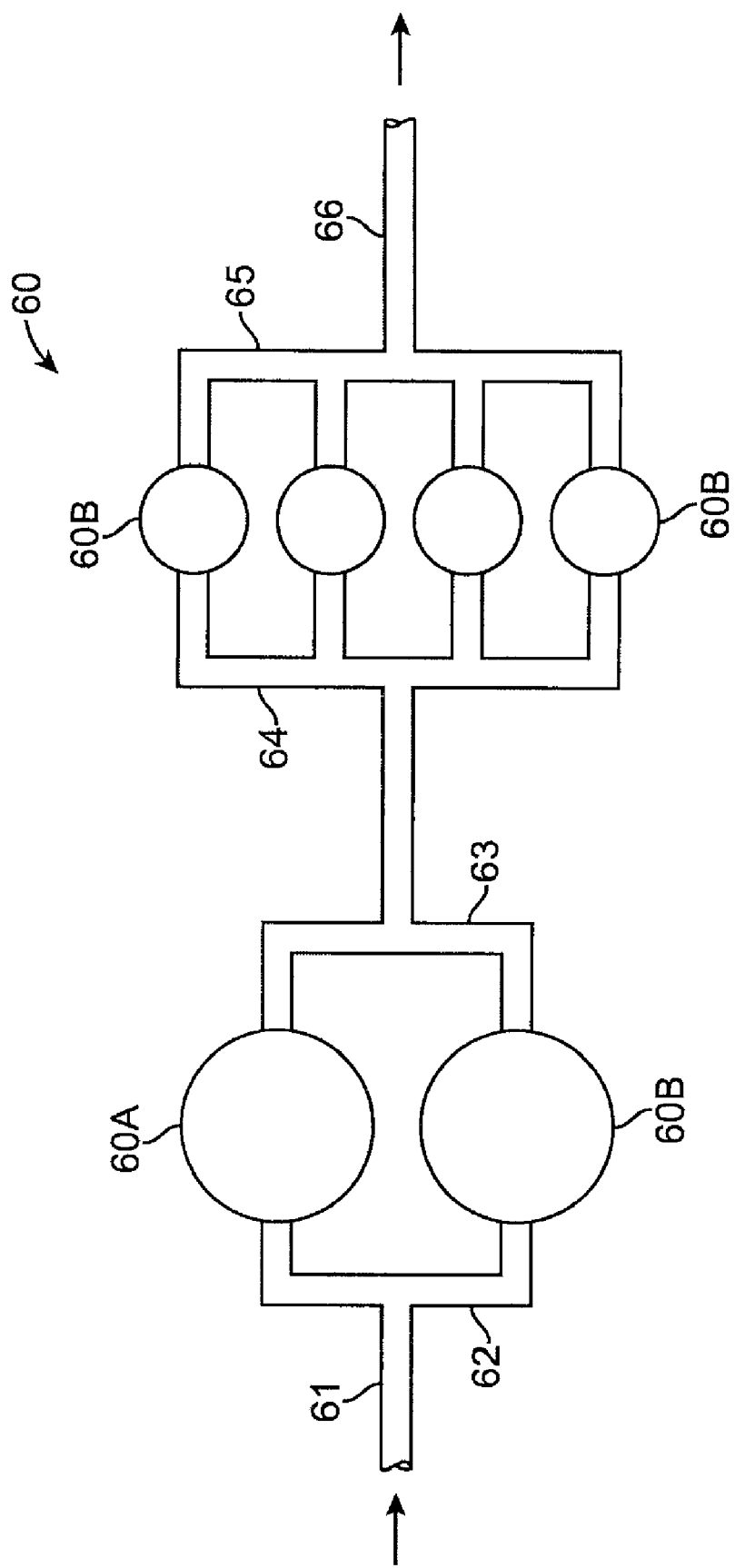
FIG. 5 is an illustration of the present system mounted for operation on a trailer.

Lastly, as seen in FIG. 5, system 10 may be mounted onto a trailer 80 such that it can be driven to a work site.

What is claimed is:

1. A vacuum system for wastewater removal and filtration, comprising:
   (1) at least one velocity reducing gravity separator, comprising:
      (a) a water input line;
      (b) a water velocity reduction mechanism at an end of the water input line;
      (c) settling tank; and
      (d) a water output line; and
   (2) at least one negative pressure filter pump, comprising:
      (a) a water input line;
      (b) a water velocity reduction mechanism at an end of the water input line;
      (c) a filtration tank;
      (d) a filter cloth in the filtration tank;
      (e) a sump pump disposed on an opposite side of the filter cloth from the water input line;
      (f) a water output line connected to the sump pump; and
      (g) an air vacuum exit line.

2. The system of claim 1, further comprising:
   at least one cartridge filter connected to the water output line of the negative pressure filter pump.

3. The system of claim 1, further comprising:
   a vacuum connected to the air vacuum exit line.

4. The system of claim 3, wherein the vacuum is a HEPA vacuum.

5. The system of claim 1, wherein the water velocity reduction mechanism changes the direction of the flow of water in the water input line.

6. The system of claim 5, wherein the change in direction is 90 degrees.

7. The system of claim 1, wherein an inlet to the water output line is positioned below the water velocity reduction mechanism at the end of the water input line.

8. The system of claim 1, wherein the inlet to the water output line is positioned such that water can not pass in a straight line from the water velocity reduction mechanism into the inlet to the water output line.

9. The system of claim 1, wherein the wastewater is filtered at levels up to 1 micron.

10. The system of claim 1, wherein the at least one velocity reducing gravity separator comprises a pair velocity reducing gravity separators connected in series.

11. The system of claim 1, wherein the filter cloth is positioned at an angle in the filtration tank.

12. The system of claim 11, wherein the angle is about 45 degrees.

13. The system of claim 1, wherein the filter cloth is positioned in a conical arrangement in the filtration tank.

14. The system of claim 1, wherein the system is mounted on a vehicle.

* * * * *